(12) United States Patent
Azema et al.

(10) Patent No.: US 6,248,470 B1
(45) Date of Patent: Jun. 19, 2001

(54) PRESSURE SENSITIVE CIRUIT BREAKER

(75) Inventors: Tadamitsu Azema; Yoshinori Ishikawa, both of Miyagi-ken (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/185,684

(22) Filed: Nov. 4, 1998

(30) Foreign Application Priority Data

Nov. 20, 1997 (JP) .................................................. 9-320021

(51) Int. Cl.⁷ ...................................................... H01M 2/34
(52) U.S. Cl. ................................ 429/61; 429/57; 429/90
(58) Field of Search ............................ 429/61, 56, 90, 429/7

(56) References Cited

U.S. PATENT DOCUMENTS 4,345,611 * 8/1982 Ikeda et al. .
4,943,497   7/1990 Oishi et al. .
5,985,478 * 11/1999 Kim .

* cited by examiner

*Primary Examiner*—John S. Maples
(74) *Attorney, Agent, or Firm*—Brinks Hofer Gilson & Lione

(57) ABSTRACT

The pressure sensitive circuit breaker comprises a diaphragm portion formed by grinding a part of a lid so as to have a wall thickness which is small in comparison with other portions of the lid, the diaphragm portion being displaced by an internal pressure of a battery, a cut-off element having a cut-off circuit and held by the lid, the cut-off element functioning to cut off the cut-off circuit by displacement of the diaphragm portion with an increase in internal pressure of the battery, an external electrode connected to one end of the cut-off circuit, and inner connection means for connecting an opposite end of the cut-off circuit of the cut-off element with a power generating element located in the interior of the battery.

4 Claims, 12 Drawing Sheets

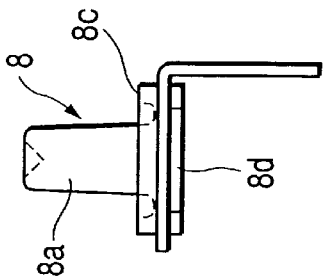
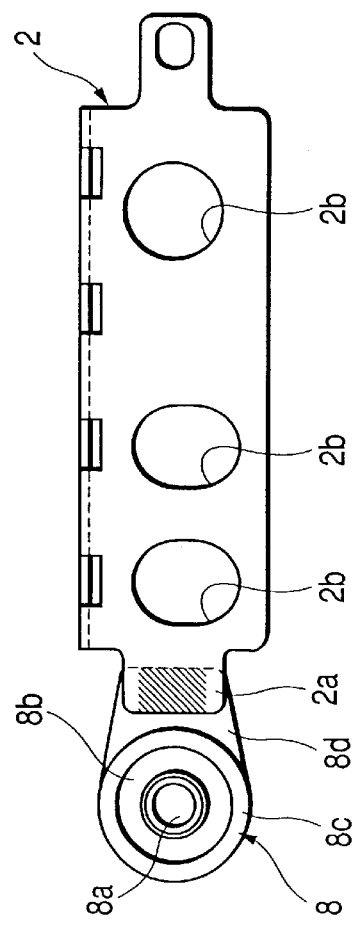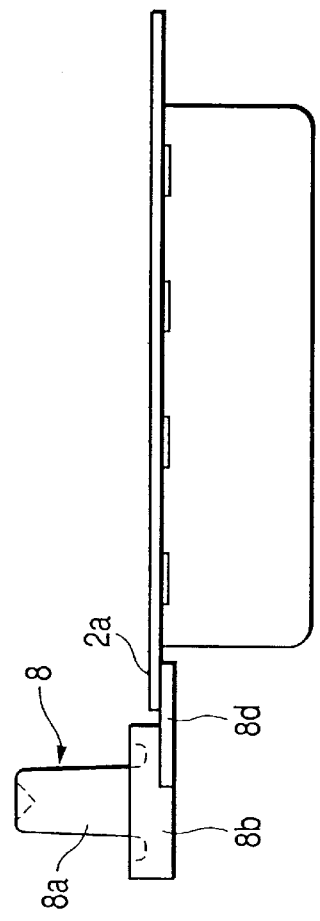

PRESSURE SENSITIVE CIRUIT BREAKER

BACKGROUND OF THE INVENTION

1. Field of the Invention

The present invention relates to a pressure sensitive circuit breaker (hereinafter referred to as "PSCB") to be used for ensuring the safety of a storage battery such as a secondary battery capable of being regenerated by re-charging. Particularly, the invention is concerned with a PSCB having a rectangular lid.

2. Description of the Prior Art

If a storage battery of this type is continued to be charged even after completion of charging or if it is charged with an electric current larger than a predetermined current, a trouble may arise in the storage batter, with evolution of gas therein, increase of pressure and temperature in the battery, consequent swelling of the battery, further, oozing of electrolyte caused by cracking and consequent bad influence on the device in which the battery is installed. Even if the result is not to such an extent, if the battery is continued to be used in such a state, the aforesaid swelling of the battery will proceed and may cause cracking or burst. Thus, as to a storage battery which has undergone some trouble, it is necessary to stop the use thereof immediately.

Among the devices for which the reduction of size has been required recently, there are many devices which are characterized by their small wall thickness. With this tendency, square or rectangular batteries have come to be used. Also in this case, reduction of thickness remains to be solved. On the other hand, in reply to a keen demand for safety, it is necessary to incorporate a safety valve and a current cut-off mechanism in such devices.

In a conventional PSCB referred to above, when the internal pressure of a storage battery increases due to some abnormal chemical change of a power generating element, the increased pressure acts on a safety valve, so that the safety valve is lifted and an electric conduction passage which connects a central projection with a lead through a lead stripper plate is stripped or broken. As the pressure further increases and reaches a predetermined level, a thin-walled portion of the safety valve is broken and a gas present in a battery case and having the increased pressure is released to the exterior through a hole formed in a lid.

However, the prior art described above involves a problem of complicated manufacture because a member for diaphragm is connected to the lid (a negative case) by caulking or welding. Particularly, in the case of welding, since spot welding is performed continuously, it has so far been necessary to ensure reliability of the welded portion so as to afford a satisfactory airtightness of the same portion and also necessary to inspect the welded portion.

Since two spaces (edges) for welding or caulking are needed in the transverse direction, the width of the diaphragm is narrowed relative to the width of the battery, resulting in that it becomes difficult to take a certain displacement of the diaphragm.

Even if the shape of the diaphragm is made elliptic or the like, it is not so effective because the diaphragm displacement is substantially restricted at a portion where the distance between the center and the peripheral edge is the shortest.

SUMMARY OF THE INVENTION

It is the first object of the present invention to provide a PSCB not requiring such a bonding allowance for the portion to be welded as in the prior art, capable of forming a large diaphragm portion and reducing the size, especially thickness, of a battery in its external form, permitting a large displacement of the diaphragm portion and ensuring a reliable operation thereof, permitting the diaphragm portion to be easily machined with a high accuracy integrally with a lid by grinding, with neither a hole nor a gap being formed in a bonded portion by welding which hole or gap is formed in the prior art, and capable of greatly reducing the number of machining and testing steps.

It is the second object of the present invention to provide a PSCB which permits a safety valve portion to be machined simultaneously with the diaphragm portion by grinding and which is easy to manufacture.

It is the third object of the present invention to provide a PSCB wherein a holder can be fixed without any substantial increase in the number of components even with omission of the conventional member for diaphragm.

The above first object is attained by the first means comprising a lid connected to a case of a battery in an airtight manner, a diaphragm portion formed by grinding a part of the lid so as to have a wall thickness which is small in comparison with other portions of the lid, the diaphragm portion being displaced by an internal pressure of the battery, a cut-off member having an electric conduction passage and held directly or indirectly by the lid, the cut-off member functioning to cut off the electric conduction passage by displacement of the diaphragm portion with an increase in internal pressure of the battery, an outer connection means connected to one end of the electric conduction passage of the cut-off member, and an inner connection means for connecting an opposite end of the electric conduction passage of the cut-off member with a power generating element located in the interior of the battery.

The above second object is attained by a second means in combination with the first means wherein the lid has a safety valve integral with the lid, a part of the safety valve being broken when the internal pressure of the battery reaches a predetermined value or more, said part of the safety valve being small in wall thickness in comparison with other portions of the lid.

The above third object is attained by a third means in combination with the first means which has an insulating holder and a fixing portion formed in the holder by insert molding, the fixing portion being made of a metal and connected to the outer or the inner connection means and welded to the lid.

BRIEF DESCRIPTION OF THE DRAWINGS

FIGS. 17A, 17B and 17C are a plan view, a front view and a right side view, respectively, showing a connected state of a rivet and a terminal portion.

DETAILED DESCRIPTION OF A PREFERRED EMBODIMENT

An embodiment of the present invention will be described in detail hereinafter with reference to the accompanying drawings.

Figure 1:
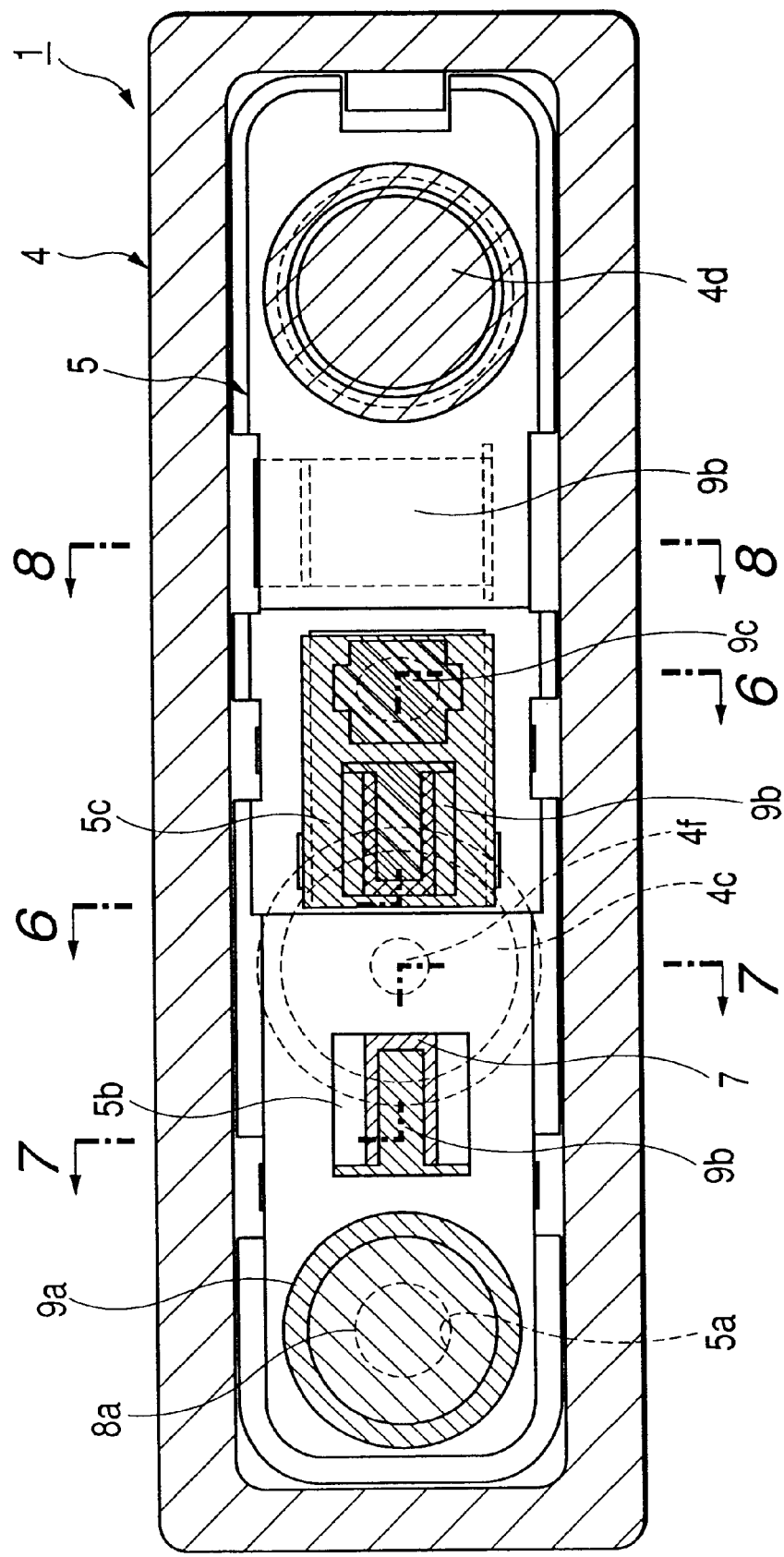
FIG. 1 is a horizontal sectional view of a pressure sensitive circuit breaker (PSCB) according to an embodiment of the present invention.
Figure 2:
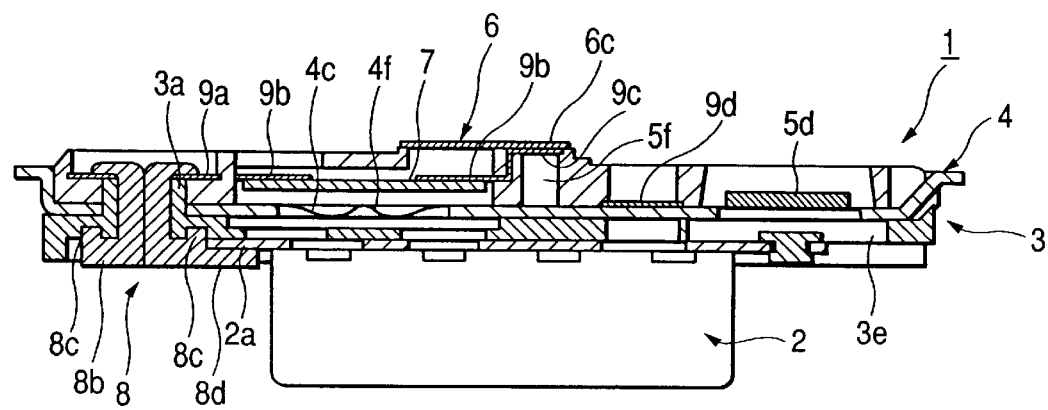
FIG. 2 is a longitudinal sectional view of the PSCB.
Figure 3:
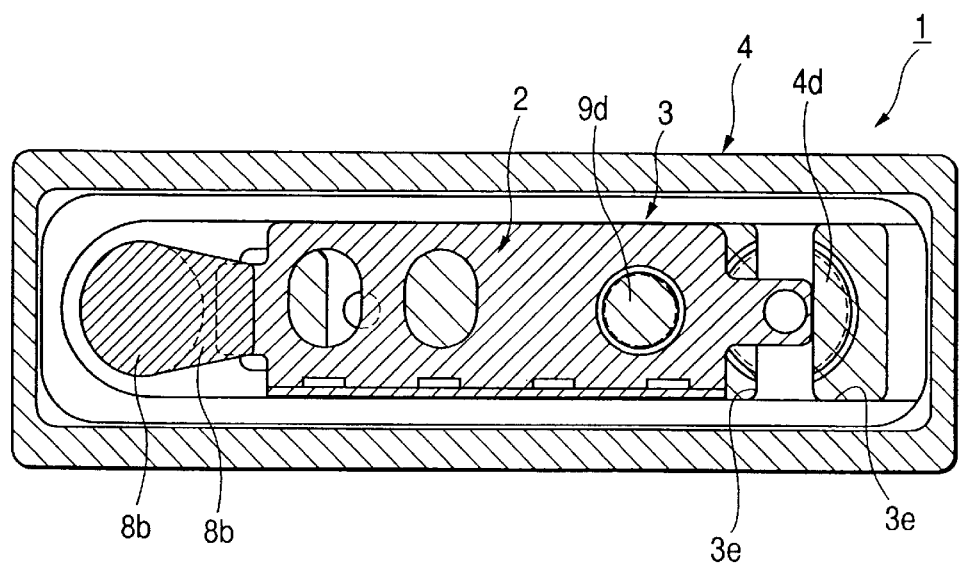
FIG. 3 is a horizontal sectional view of the PSCB.
Figure 4:
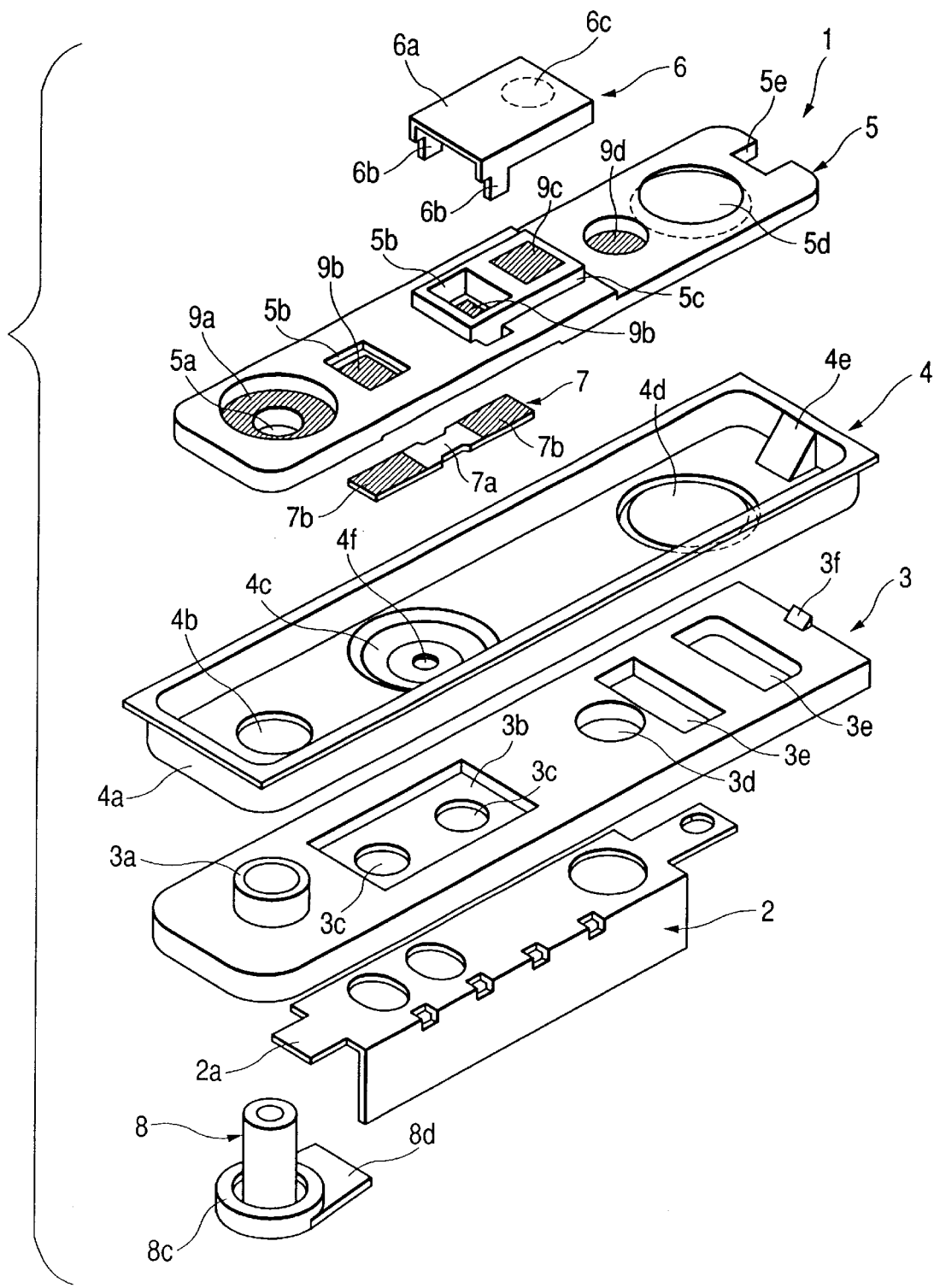
FIG. 4 is an exploded perspective view of the PSCB.
Figure 5:
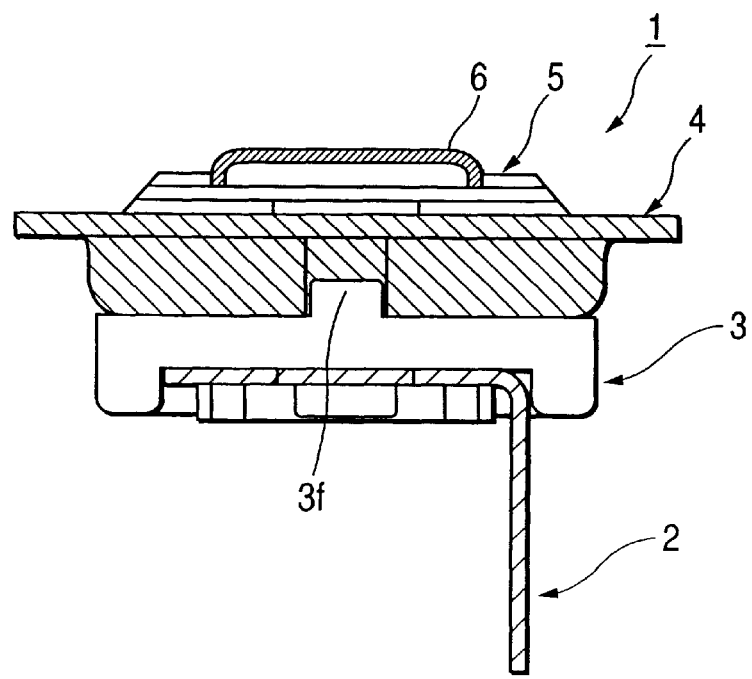
FIG. 5 is a side view of the PSCB.
Figure 6:
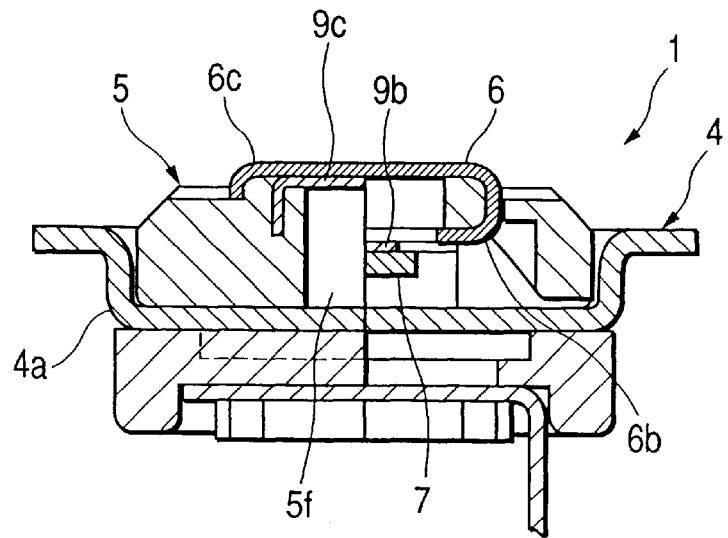
FIG. 6 is a vertical sectional view taken along line 6—6 in FIG. 1.
Figure 7:
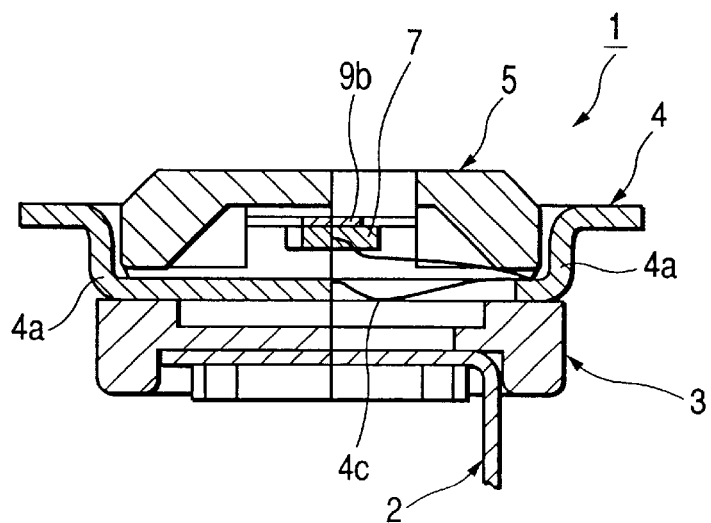
FIG. 7 is a vertical sectional view taken along line 7—7 in FIG. 1.
Figure 8:
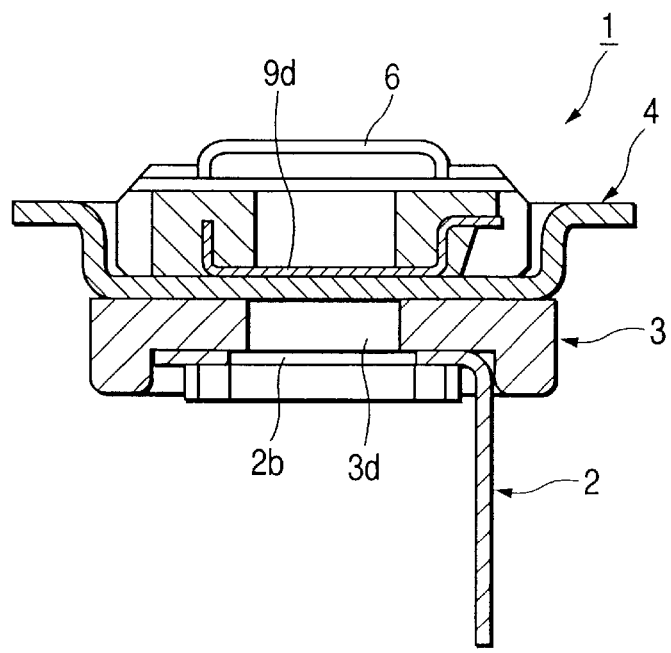
FIG. 8 is a vertical sectional view taken along line 8—8 in FIG. 1.
Figure 9:
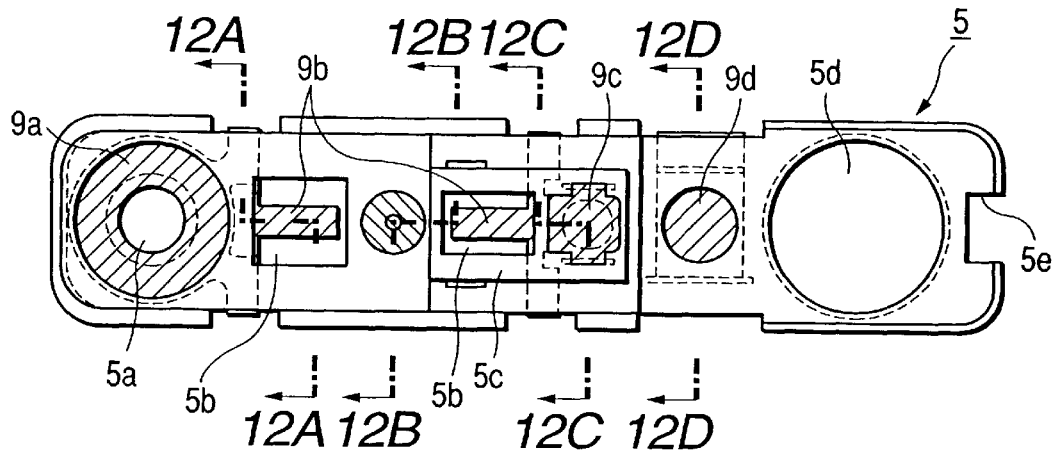
FIG. 9 is a bottom view of a holder.
Figure 10:
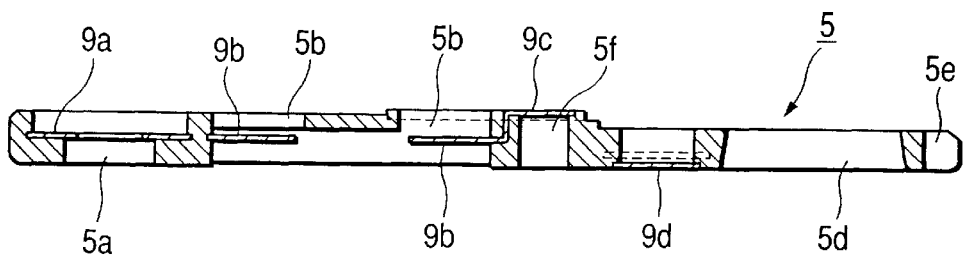
FIG. 10 is a longitudinal sectional view of the holder.
Figure 15:
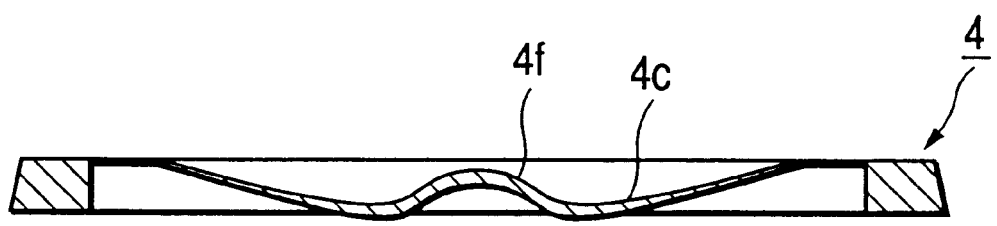
FIG. 15 is an explanatory diagram showing a diaphragm portion of the lid on a larger scale.
Figure 16:
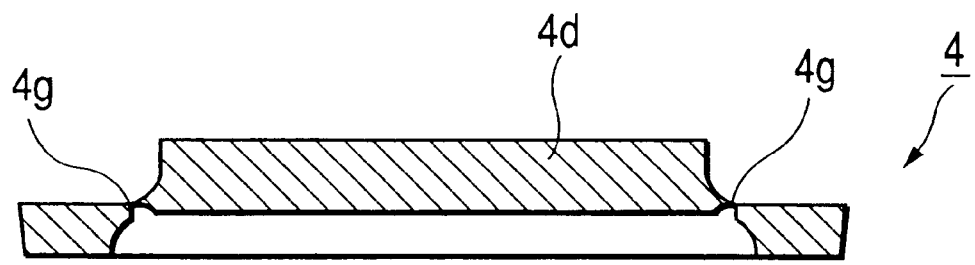
FIG. 16 is an explanatory diagram showing a safety valve portion of the lid on a larger scale.
Figure 18A:
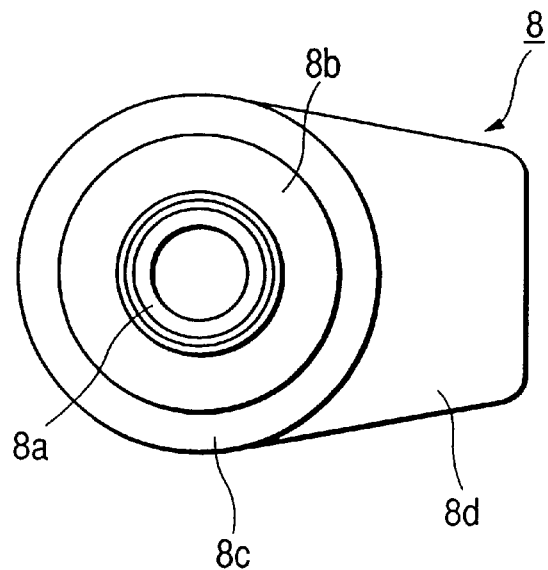
FIGS. 18A and 18B are a plan view and a vertical sectional view, respectively, of the rivet.
Figure 18B:
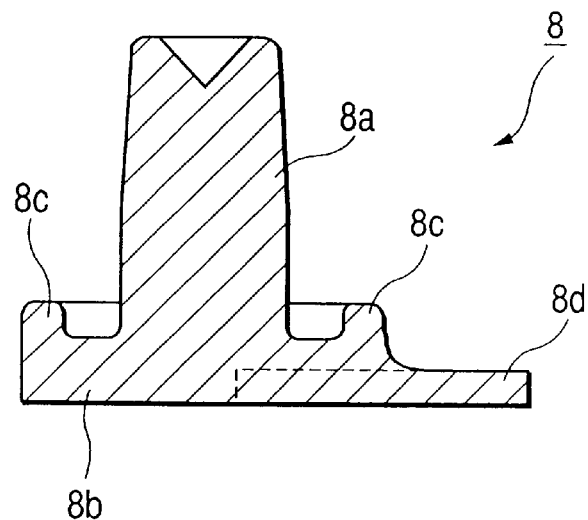

FIG. 1 is a horizontal sectional view of a pressure sensitive circuit breaker (PSCB), FIG. 2 is a longitudinal sectional view of the PSCB, FIG. 3 is a horizontal sectional view of the PSCB, FIG. 4 is an exploded perspective view of the PSCB, FIG. 5 is a side view of the PSCB, FIG. 6 is a vertical sectional view taken along line 6—6 in FIG. 1, FIG. 7 is a vertical sectional view taken along line 7—7 in FIG. 1, FIG. 8 is a vertical sectional view taken along line 8—8 in FIG. 1, FIG. 9 is a bottom view of a holder, FIG. 10 is a longitudinal sectional view of the holder, FIGS. 12A, 12B, 12C and 12D are vertical sectional views taken along lines 12A—12A, 12B—12B, 12C—12C and 12D—12D, respectively, in FIG. 9, FIGS. 13A, 13B and 13C are a plan view, a front view and a right side view, respectively, of a lead of the holder, FIGS. 14A, 14B, 14C and 14D are a plan view, a right side view, a longitudinal sectional view and a bottom view, respectively, of the lid, FIG. 15 is an explanatory diagram showing a diaphragm portion of the lid on a larger scale, FIG. 16 is an explanatory diagram showing a safety valve portion of the lid on a larger scale, FIGS. 17A, 17B and 17C are a plan view, a front view and a right side view, respectively, showing a connected state of a rivet and a terminal portion, and FIGS. 18A and 18B are a plan view and a vertical sectional view, respectively, of the rivet.

In these figures, the numeral 1 denotes the PSCB embodying the present invention. The PSCB 1, which is generally rectangular as a whole, mainly comprises a terminal portion 2, an insulator 3, a lid (negative case) 4, a holder 5, an external electrode 6, a cut-off element 7, and a rivet 8.

The terminal portion 2 is made of aluminum. As shown in FIGS. 4 and 17A to 17C, the terminal portion 2 is bent approximately at right angles and a connecting piece portion 2a to be welded to a connecting piece portion 8d of the rivet 8 is extended from one longitudinal end of the terminal portion 2 (the hatched area in FIG. 17A is the welded area). Numeral 2b denotes an aperture.

The insulator 3, which is formed of an insulating synthetic resin, comprises a cylindrical portion 3a formed at a position close to one end of the insulator 3 for insertion therethrough of the rivet 8, a recess 3b which permits a diaphragm portion 4c of the lid 4 to swell inwards, vent holes 3c, 3c formed in the bottom of the recess 3b, a hole 3d for welding, generally rectangular apertures 3e, 3e for communication with a safety valve portion of the lid 4, and a positioning lug 3f.

The lid 4 is formed by an electrically conductive metallic plate such as a stainless steel plate and, as shown in FIGS. 14A to 14D, an upwardly projecting annular projection 4a is formed on an outer peripheral portion of the lid 4. In the bottom of the lid 4 are formed a hole 4b at a position close to one end of the lid bottom for insertion therethrough of the cylindrical portion 3a with the rivet 8 inserted therethrough, the diaphragm portion 4c formed thin integrally by grinding, a safety valve portion 4d formed by half blanking, and a positioning lug 4e.

After the diaphragm portion 4c is formed thin by grinding, it is bulged in a bowl shape inwards of the battery by press working. The diaphragm portion 4c is centrally provided with a breaking projection 4f for breaking a cut-off element 7 which is mounted centrally above the diaphragm portion. Therefore, the diaphragm portion 4c is pressed outwards with an increase in internal pressure of the battery and performs a reversing motion as soon as the internal pressure exceeds a certain level.

The safety valve portion 4d has such an annular thin-walled portion 4g as shown in FIG. 16 formed by pressing the bottom of the lid 4 with an annular punch. The thin-walled portion 4g is broken upon generation of an excessive internal pressure of the battery.

Figure 11:
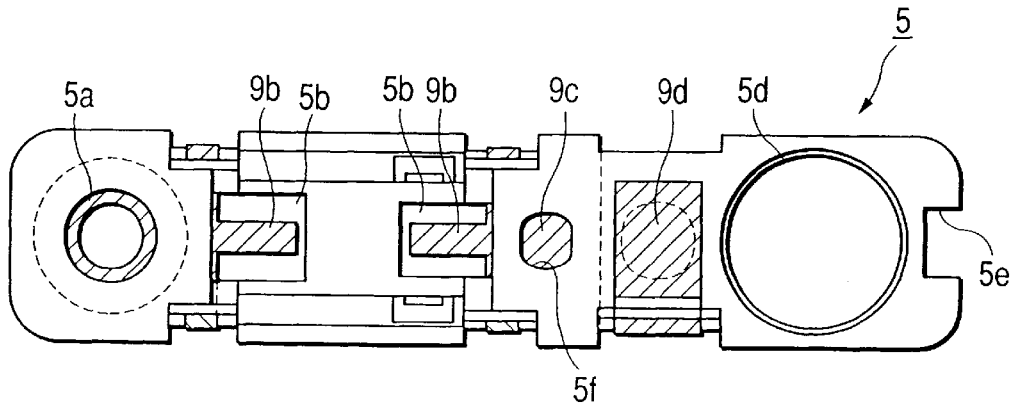
Figure 12A:
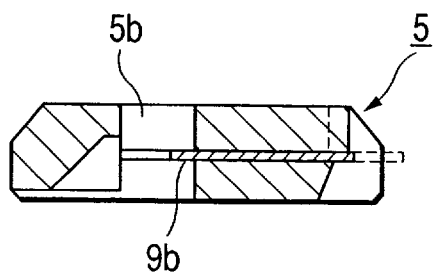
FIGS. 12A, 12B, 12C and 12D are vertical sectional views taken along lines 12A—12A, 12B—12B, 12C—12C and 12D—12D, respectively, in FIG. 9.
Figure 12B:
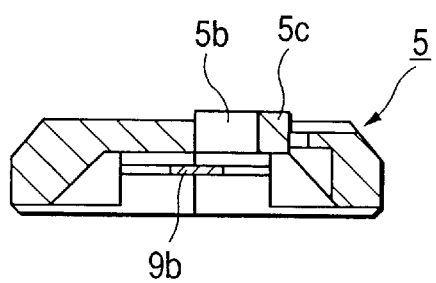
Figure 12C:
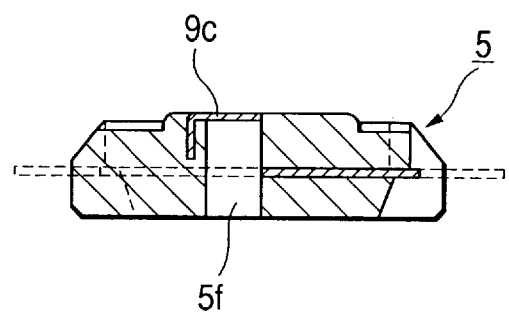
Figure 12D:
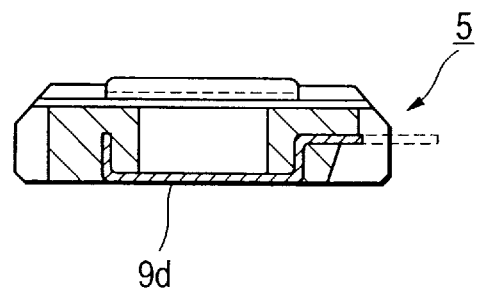

The holder 5 is formed of an insulating resin such as PPS and, as shown in FIG. 2, it is of a size capable of being fitted in the projection 4a of the lid 4. In the holder 5, as shown in FIGS. 9 to 11, are formed a through hole 5a for insertion therethrough of the cylindrical portion 3a with the rivet 8 inserted therethrough, a rivet connecting portion 9a for the rivet 8, the rivet connecting portion 9a being provided in a recess formed around the through hole 5a, which are both located near one end of the holder 5, apertures 5b, 5b with a pair of leads 9b, 9b projecting therein respectively, a pedestal portion 5c which holds an external electrode 6, an external electrode connecting portion 9c for connection with a connecting portion of the external electrode 6, a fixing portion 9d to be welded to the lid 4, an aperture 5d formed in a position corresponding to the safety valve portion 4d, and a cutout portion 5e for fitting therein of the positioning lug 4e of the lid 4. In the lower surface of the holder 5 is formed a hole 5f for welding to which is exposed the lower surface of the external electrode connecting portion 9c. A welding tool is inserted into the hole 5f and is brought into contact with the lower surface of the external electrode connecting portion 9c of the holder 5, while a welding tool is brought from above into contact with the connecting portion 6c of the external electrode 6, to sandwich the external electrode connecting portion 9c and the connecting portion 6c. In this state, spot welding is performed to fix the external electrode 6 to the holder 5 and make an electric connection to a lead 9b.

Figure 13A:
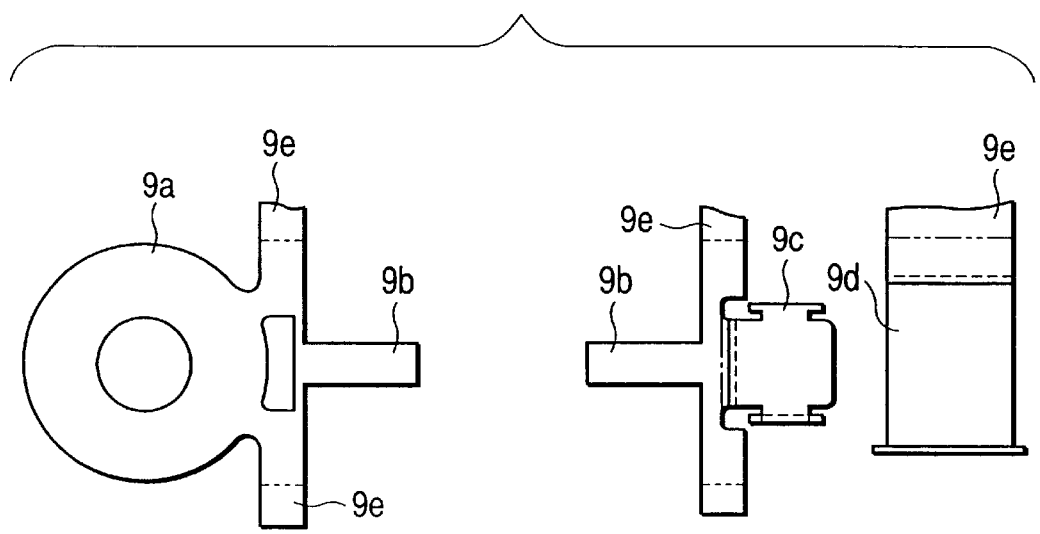
FIGS. 13A, 13B and 13C are a plan view, a front view and a right side view, respectively, of a lead of the holder.
Figure 13B:
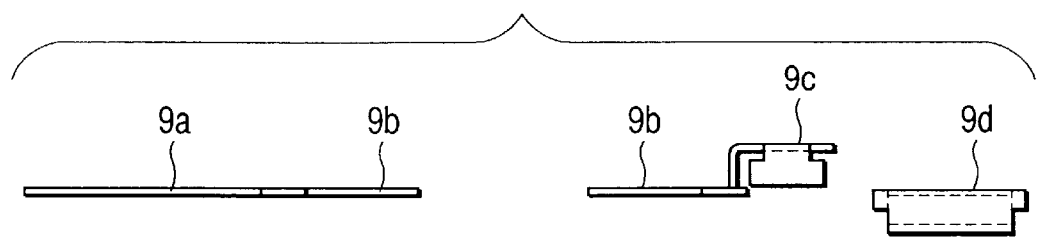
Figure 13C:
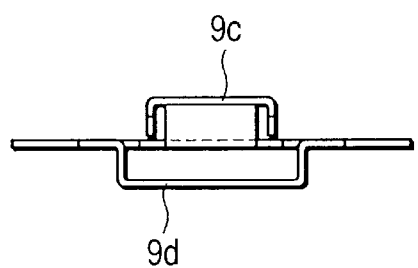
Figure 14A:
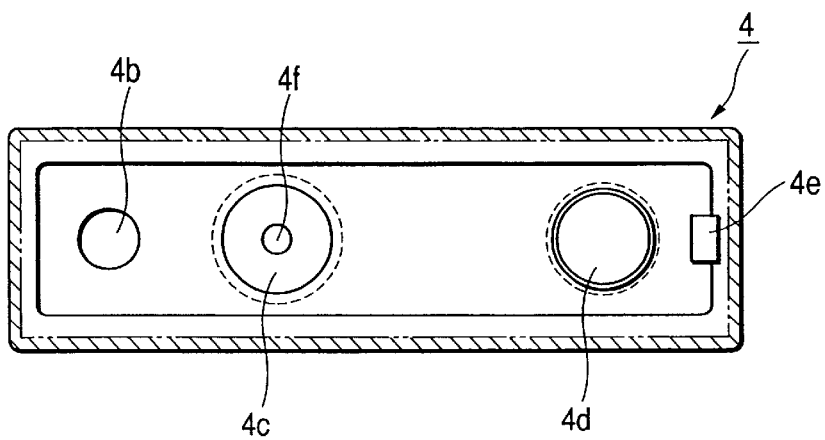
FIGS. 14A, 14B, 14C and 14D are a plan view, a right side view, a longitudinal sectional view and a bottom view, respectively, of the lid.
Figure 14B:
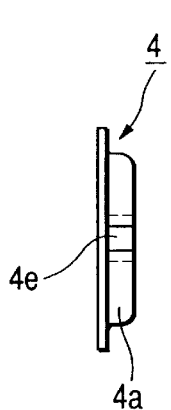
Figure 14C:
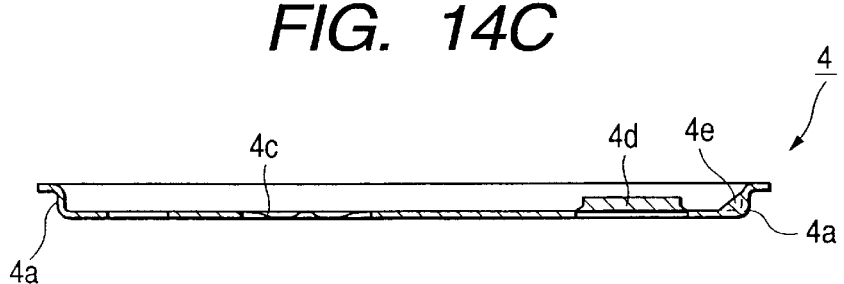
Figure 14D:
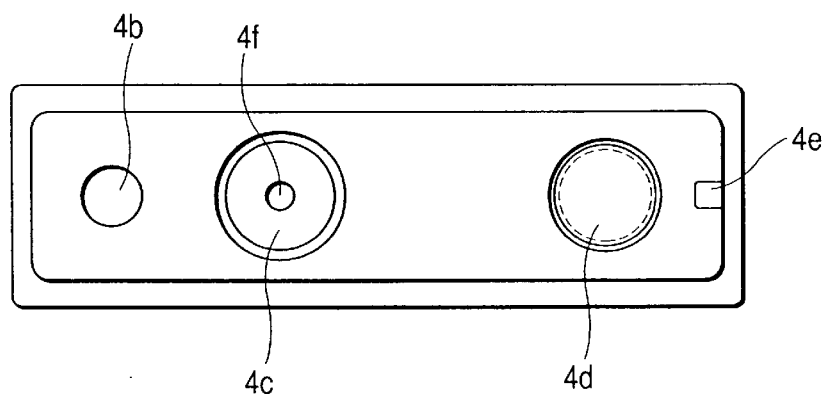

As shown in FIGS. 13A to 13C, the rivet connecting portion 9a, the paired leads 9b, 9b, the external electrode connecting portion 9c and the fixing portion 9d are initially connected in a hoop shape to a frame (not shown) through a connecting portion 9e. The hoop is formed using an electrically conductive material such as nickel. In forming the hoop, the holder 5 shown in FIGS. 9 to 11 is formed by insert molding with use of an insulating resin and thereafter the connecting portion 9e is cut at the position of dash-double dot lines. Thus, the rivet connecting portion 9a and one lead 9b are connected together. The lead is connected to the other lead 9b and the external electrode connecting portion 9c through a cut-off element 7. On the other hand, the fixing portion 9d is not electrically connected to the rivet connection portion 9a, the leads 9b or the electrode connection portion 9c.

The holder 5 is fixed by resistance-welding the fixing portion 9d to the bottom of the lid 4 located on the underside of the fixing portion. A welding tool for the resistance welding can be brought into abutment with the bottom of the lid 4 from the welding hole 3d of the insulator 3 located on the lid bottom.

The cut-off element 7, which is generally in the shape of a belt, comprises an insulating ceramic or resin base plate 7a and a cut-off circuit 7b formed on the upper surface side of the base plate 7a by printing or by lamination of a metallic foil. The leads 9b, 9b of the holder 5 are connected respectively to both longitudinal ends of the cut-off circuit 7b.

The cut-off element 7 is disposed above the diaphragm portion 4c, so upon reversal of the diaphragm portion 4c with an increase in internal pressure of the battery, the cut-off circuit 7b of the cut-off element 7 can be cut off positively by the breaking projection 4f of the diaphragm portion.

The external electrode 6 is formed from steel plated with nickel and it becomes a positive electrode of a storage battery (not shown) when the PSCB 1 is installed into the battery. The external electrode 6 comprises a generally rectangular body portion 6a, leg portions 6b, 6b bent from both side edges of the body portion 6a, and a connecting portion 6c to be welded to the connecting portion 9b of the holder 5. As shown in FIG. 6, the leg portions 6b are bent to fix the external electrode 6 to the holder 5.

The rivet 8 is formed of aluminum and, as shown in FIGS. 18A and 18B, it comprises a columnar portion 8a whose upper end portion is somewhat smaller in diameter, a flange portion 8b formed at the lower end, an annular projection 8c projecting along the outer periphery of the flange portion 8b, and the connecting piece portion 8d extending sideways from the outer peripheral surface of the flange portion 8b. To the connecting piece portion 8d is fusion-bonded the connecting piece portion 2a of the terminal portion 2, as noted previously. The insulator 3, lid 4 and holder5 are made integral with one another by caulking of the rivet 8. The upper end of the columnar portion 8a of the rivet 8 is caulked and connected to the rivet connecting portion 9a of the holder 5. Consequently, the external electrode 6 is connected to the terminal portion 2 through the cut-off circuit 7b of the cut-off element 7, etc.

Although in the above embodiment the diaphragm portion is formed thin by grinding, it may be formed thin by press working.

The following description is now provided about a method for installing the PSCB 1 into a storage battery (a secondary lithium ion battery).

By inserting the PSCB 1 from above into a battery case of the storage battery (not shown) and then caulking the lid 4 throughout the whole circumference of a caulking portion of the battery case, the PSCB 1 is surely installed and sealed into the storage battery.

Reference will now be made to the operation of the PSCB 1 as used in the above secondary lithium ion battery.

In the PSCB 1, while the battery is charged, an electric current flows successively from the external electrode (positive electrode) 6 to lead 9b, cut-off circuit 7b of the cut-off element 7, lead 7a, rivet 8 and terminal portion 2.

In this case, if the electric current is continued to flow even after completion of the charging, with consequent overcharging, or if the charging is performed with an electric current larger than the predetermined level of current, there will occur an abnormal condition in the storage battery (not shown) and the internal pressure and temperature of the battery will increase.

The increased internal pressure of the storage battery will be transmitted as an external pressure to the PSCB 1. As a result, as shown in FIG. 3, this external pressure acts to deflect the diaphragm portion 4c of the lid 4 upward through vent holes 3c, 3c of the insulator 3. Then, when the increased internal pressure of the storage battery has reached a certain level, the diaphragm portion 4c of the lid 4 reverses upward quickly and its central breaking projection 4f pushes a nearly central part of the cut-off element 7 upward, whereby the base plate 7a of the cut-off element 7 is broken.

This breakage of the cut-off element 7 causes breakage of the cut-off circuit 7b of the cut-off element 7 and the leads 9b, 9b cease to conduct, so that the PSCB 1 cuts off the electric current flowing between the external electrode 6 and a positive electrode of a power generating portion of the storage battery, whereby a further charging is stopped and the secondary lithium ion battery is made incapable of functioning as a storage battery.

With a further increase in internal pressure of the storage battery, the thin-walled portion 4g of the safety valve portion 4d in the lid 4 is broken, with the result that the gas present within the battery flows from the broken part of the thin-walled portion 4g, passes through the PSCB 1 and is discharged from the aperture 5d. For example, the operating pressure of the PSCB 1 is set to a pressure in the range of 4 to 10 atmospheres and that of the safety valve is set to a pressure in the range of 10 to 20 atmospheres.

Thus, the PSCB of the above embodiment comprises the lid 4 connected to the battery case in an airtight manner, the diaphragm portion 4c formed by grinding a part of the lid so as to have a wall thickness smaller than that of the other portion of the lid, the diaphragm portion 4c being displaced by an internal pressure of the battery, the cut-off element 7 having the cut-off circuit 7b and held directly or indirectly by the lid 4, the cut-off element 7 functioning to cut off the cut-off circuit 7b by displacement of the diaphragm portion 4c with an increase in internal pressure of the battery, an external electrode 6 connected to one end of the cut-off circuit 7b of the cut-off element 7, and the inner connecting means (2, 9b, 8) for connecting the opposite end of the cut-off circuit 7b with the power generating element located in the interior of the battery. Therefore, it is not necessary to form such a bonding allowance for the portion to be welded as in the prior art and it is possible to form large the diaphragm portion 4c. For this reason, it is possible to reduce the size, especially thickness, of an external form of the battery and increase the displacement of the diaphragm portion, thus ensuring a reliable operation. Besides, the diaphragm portion 4c can be easily machined with a high accuracy integrally with the lid 4 by grinding, so unlike the prior art there is formed neither a hole nor a gap in a bonded portion by welding for example, whereby the number of machining and testing steps can be greatly reduced.

In the above embodiment, moreover, since the lid 4 has the safety valve portion 4d integral with the lid 4 and having a wall thickness smaller than that of other portions, the safety valve portion 4d being partially broken when the internal pressure of the battery reaches a predetermined value or more, the safety valve portion 4d can also be machined together with the diaphragm portion 4c and thus the manufacture is easy.

Further, in the above embodiment, the PSCB has the insulating holder 5, as well as the external electrode connecting portion 9c and fixing portion 9d insert-molded into the holder 5, the external electrode connecting portion 9c being made of metallic and connected to the outer connection means (6) or the inner connection means (2, 9b, 8), and the fixing portion 9d is welded to the lid 4. In this connection, the external electrode connecting portion 9c and the fixing portion 9d, which are integral as a hoop with the leads 9b, 9b, are insert-molded in forming the holder 5, whereby even with omission of the conventional member for diaphragm it is possible to fix the holder 5 without any substantial increase in the number of components.

Many widely different embodiments of the invention may be constructed without departing from the spirit and the scope of the present invention. It should be understood that the present invention is not limited to the specific embodiments described in the specification, except as defined in the appended claims.

What is claimed is:

1. A pressure sensitive circuit breaker comprising:

a lid connected to a case of a battery in an airtight manner;

a diaphragm portion being a part of said lid having a wall thickness smaller than most other portions of the lid, said diaphragm portion being displaced by an internal pressure of the battery;

a cut-off member having an electric conduction passage and held indirectly by said lid, said cut-off member functioning to cut off said electric conduction passage by displacement of said diaphragm portion with an increase in internal pressure of the battery;

an outer connection mechanism connected to one end of said electric conduction passage of said cut-off member; and an inner connection mechanism to connect an opposite end of the electric conduction passage of the cut-off member with a power generating element located in an interior of the battery.

2. A pressure sensitive circuit breaker according to claim 1, wherein said lid has a safety valve integral with the lid, a part of said safety valve being broken when the internal pressure of the battery reaches a predetermined value, said part of the safety valve having a wall thickness smaller than most other portions of said lid.

3. A pressure sensitive circuit breaker according to claim 1, further comprising an insulating holder and a metal fixing portion formed in said holder by insert molding, said fixing portion welded to said lid.

4. A pressure sensitive circuit breaker according to claim 1, said lid comprising an electrically conductive metallic plate.

* * * * *

UNITED STATES PATENT AND TRADEMARK OFFICE
CERTIFICATE OF CORRECTION

PATENT NO. : 6,248,470 B1 Page 1 of 1
DATED : June 19, 2001
INVENTOR(S) : Tadamitsu Azema et al.

It is certified that error appears in the above-identified patent and that said Letters Patent is hereby corrected as shown below:

<u>Title page, Item [54], and Column 1, line 1,</u>
Title, delete "CIRUIT" and substitute -- CIRCUIT -- in its place.

Signed and Sealed this

Ninth Day of April, 2002

Attest:

Attesting Officer

JAMES E. ROGAN
*Director of the United States Patent and Trademark Office*